United States Patent
Kaczmarek et al.

(10) Patent No.: US 12,502,365 B2
(45) Date of Patent: Dec. 23, 2025

(54) USE OF MARIMASTAT FOR PREVENTING AND/OR TREATING EPILEPTOGENESIS

(71) Applicants: Instytut Biologii Doswiadczalnej Im. Marcelego Nenckiego Polska Akademia Nauk, Warsaw (PL); Uniwersytet Warszawski, Warsaw (PL)

(72) Inventors: Leszek Kaczmarek, Komorów (PL); Barbara Pijet-Binkiewicz, Warsaw (PL); Anna Konopka, Warsaw (PL); Emilia Rejmak-Kozicka, Warsaw (PL)

(73) Assignees: INSTYTUT BIOLOGII DOSWIADCZALNEJ IM. MARCELEGO NENCKIEGO POLSKA AKADEMIA NAUK, Warsaw (PL); UNIWERSYTET WARSZAWSKI, Warsaw (PL)

( * ) Notice: Subject to any disclaimer, the term of this patent is extended or adjusted under 35 U.S.C. 154(b) by 927 days.

(21) Appl. No.: 17/620,256

(22) PCT Filed: Jun. 17, 2019

(86) PCT No.: PCT/IB2019/055040
§ 371 (c)(1),
(2) Date: Dec. 17, 2021

(87) PCT Pub. No.: WO2020/254853
PCT Pub. Date: Dec. 24, 2020

(65) Prior Publication Data
US 2022/0347129 A1 Nov. 3, 2022

(51) Int. Cl.
A61K 31/16 (2006.01)
A61P 25/08 (2006.01)

(52) U.S. Cl.
CPC ............. A61K 31/16 (2013.01); A61P 25/08 (2018.01)

(58) Field of Classification Search
CPC .............................. A61P 25/08; A61K 31/16
USPC ........................................................ 514/616
See application file for complete search history.

(56) References Cited

PUBLICATIONS

Lowenstein et al., It's Time to Revise the Definition of Status Epilepticus, Epilepsia, 1999, vol. 40(1), pp. 120-122. (Year: 1999).*
Thomas et al., Marimastat: the clinical development of a matric metalloproteinase inhibitor, Exp. Opin. Invest. Drugs, 2000, vol. 9(12), pp. 2913-2922. (Year: 2000).*
Ikonomidou, Matrix metalloproteinases and epileptogenesis, Molecular and Cellular Pediatrics, 2014, vol. 1(6), pp. 1-6 (Year: 2014).*
Thomas et al., Marimastat: the clinical development of a matrix metalloproteinase inhibitor, Exp. Opin. Invest. Drugs, 2000, vol. 9(12), pp. 2913-2922 (Year: 2000).*
Annegers, John F., et al., "A Population-Based Study of Seizures After Traumatic Brain Injuries", The New England Journal of Medicine, Jan. 1, 1998, pp. 20-24.
Bramhall, SR , et al., "Marimastat as First-Line Therapy for Patients With Unresectable Pancreatic Cancer: A Randomized Trial", Journal of Clinical Oncology, vol. 19, No. 15 Aug. 1, 2001: pp. 3447-3455.
Bramhall, SR , et al., "Marimastat as maintenance therapy for patients with advanced gastric cancer: a randomised trial", British Journal of Cancer (2002) vol. 86, pp. 1864-1870.
Buckmaster, Paul S., "Mossy Fiber Sprouting in the Dentate Gyrus", In: Noebels JL, Avoli M, Rogawski MA, et al., editors. Jasper's Basic Mechanisms of the Epilepsies [Internet]. 4th edition. Bethesda (MD): National Center for Biotechnology Information (US); 2012.
Chuang, Yao-Chung , et al., "Mitochondrial Dysfunction and Ultrastructural Damage in the Hippocampus during Kainic Acid-induced Status Epilepticus in the Rat", Epilepsia, 45(10):pp. 1202-1209, 2004, Blackwell Publishing, Inc.
Evans, JD , et al., "A phase II trial of marimastat in advanced pancreatic cancer", British Journal of Cancer (2001) 85 (12), pp. 1865-1870 © 2001 Cancer Research Campaign doi: 10.1054/ bjoc.2001.2168, available online at http://www.idealibrary.com.
Graham, Neil S.N., et al., "Incidence and Associations of Poststroke Epilepsy The Prospective South London Stroke Register", American Heart Association, Inc., Mar. 2013, pp. 605-611.
Habas, Agata , et al., "NMDA neuroprotection against a phosphatidylinositol-3 kinase inhibitor, LY294002 by NR2B-mediated suppression of glycogen synthase kinase-3b-induced apoptosis", Journal of Neurochemistry, 2006, vol. 96, pp. 335-348.
Hesdorffer, Dale C., et al., "Risk of Unprovoked Seizure after Acute Symptomatic Seizure: Effect of Status Epilepticus", American Neurological Association, May 12, 1998, p. 908-912.
Kim, Yoon-Seong , et al., "Matrix Metalloproteinases, New Insights into the Understanding of Neurodegenerative Disorders", Biomolecules & Therapeutics 20(2), pp. 133-143 (2012).
Kimata, Masaru , et al., "Matrix Metalloproteinase Inhibitor, Marimastat, Decreases Peritoneal Spread of Gastric Carcinoma in Nude Mice", Jpn. J. Cancer Res. vol. 93, pp. 834-841, Jul. 2002.
King, Julie , et al., "Randomised double blind placebo control study of adjuvant treatment with the metalloproteinase inhibitor, Marimastat in patients with inoperable colorectal hepatic metastases: significant survival advantage in patients with musculoskeletal side-effects", Anticancer Res. Jan-Feb. 2003;vol. 23(1B): pp. 639-645.
Kleiner, David E., et al., "Structural biochemistry and activation of matrix metalloproteases", National Cancer Institute.
Matrbian, Lynn M., "Metalloproteinases and their inhibitors in matrix remodeling", Reviews, TIG Apr. 1990 vol. 6 No. 4, pp. 121-125.

(Continued)

Primary Examiner — Jeffrey H Murray
Assistant Examiner — Rilla Marie Samsell
(74) Attorney, Agent, or Firm — FISHERBROYLES, LLP; Roger L. Browdy

(57) ABSTRACT

The present invention is related to use of marimastat or a pharmaceutically acceptable salt, solvate or polymorph thereof in preventing or treating epileptogenesis in a subject that suffered a brain insult. Said brain insult is a stroke, traumatic brain injury, or a result of status epilepticus, evoked by structural or metabolic reasons. Marimastat or a pharmaceutically acceptable salt thereof is administered preferably within the first 24 hours after induction of epileptogenesis.

9 Claims, 6 Drawing Sheets

(56) References Cited

PUBLICATIONS

Millar, Andrew W., et al., "Results of single and repeat dose studies of the oral matrix metalloproteinase inhibitor marimastat in healthy male volunteers", British Journal of Clinical Pharmacology, 1998; vol. 45: pp. 21-16.

Miller, K. D., et al., "A randomized phase II pilot trial of adjuvant marimastat in patients with early-stage breast cancer", Annals of Oncology 13: 1220-1224, 2002, DOI: 10.1093/annonc/mdf199.

Mizoguchi, Hiroyuki, et al., "Matrix Metalloproteinase-9 Contributes to Kindled Seizure Development in Pentylenetetrazole-Treated Mice by Converting Pro-BDNF to Mature BDNF in the Hippocampus", The Journal of Neuroscience, Sep. 7, 2011, 31(36):pp. 12963-12971, 12963.

North, H., et al., "Effect of marimastat on serum tumour markers in patients with colorectal cancer", International Journal of Surgical Investigation, Jan. 1, 2000, 2(3): pp. 213-217.

Pitkanen, Asla, et al., "Epileptogenesis", Cold Spring Harb Perspect Med 2015;5:a022822.

Racine, Ronald J., "Modification of Seizure Activity By Electrical Stimulation: II. Motor Seizure", Electroencephalography and Clinical Neurophysiology, 1972, vol. 32: pp. 281-294.

Rasmussen, Henrik S., "Matrix Metalloproteinase Inhibition as a Novel Anticancer Strategy: A Review with Special Focus on Batimastat and Marimastat", Pharmacol. Ther. vol. 75, No. 1, pp. 69-75, 1997.

Renkiewicz, Richard, et al., "Broad-Spectrum Matrix Metalloproteinase Inhibitor Marimastat-Induced Musculoskeletal Side Effects in Rats", Arthritis & Rheumatism, vol. 48, No. 6, Jun. 2003, pp. 1742-1749, DOI 10.1002/art.11030.

Rosemurgy, Alexander, et al., "Marimastat in Patients With Advanced Pancreatic Cancer", Am J Clin Oncol (CCT) 22(3): pp. 247-252, 1999.

Sparano, Joseph A., et al., "Randomized Phase III Trial of Marimastat Versus Placebo in Patients With Metastatic Breast Cancer Who Have Responding or Stable Disease After First-Line Chemotherapy: Eastern Cooperative Oncology Group Trial E2196", Journal of Clinical Oncology, vol. 22, 23, Dec. 1, 2004, pp. 4683-4690.

Steward, William P., "Marimastat (BB2516): Current status of development", Cancer Chemother Pharmacol (1999) 43(Suppl): S56-S60.

Szklarczyk, Arek, "Matrix Metalloproteinase-9 Undergoes Expression and Activation during Dendritic Remodeling in Adult Hippocampus", The Journal of Neuroscience, Feb. 1, 2002, 22(3):pp. 920-930.

Thomas, Anne L., "Marimastat: the clinical development of a matrix metalloproteinase inhibitor", Expert Opinion on Investigational Drugs, vol. 9, 2000—Issue 12.

Vafadari, Behnam, et al., "MMP-9 in translation: from molecule to brain physiology, pathology, and therapy", Journal of Neurochemistry, 2016.

Wang, Qun, et al., "Kainic Acid-Mediated Excitotoxicity as a Model for Neurodegeneration", Molecular Neurobiology, vol. 31, 2005, pp. 3-16.

Wilczynski, Grzegorz M., et al., "Important role of matrix metalloproteinase 9 in epileptogenesis", The Journal of Cell Biology, vol. 180, No. 5, Mar. 10, 2008, pp. 1021-1035.

Wojtowicz-Praga, Slawomir, et al., "Phase I Trial of Marimastat, a Novel Matrix Metalloproteinase Inhibitor, Administered Orally to Patients With Advanced Lung Cancer", Journal of Clinical Oncology, vol. 16, No. 6 Jun. 1998: pp. 2150-2156.

Zhang, J. Wenjun, et al., "Regional and age-related expression of gelatinases in the brains of young and old rats after treatment with kainic acid", Neuroscience Letters 295 (2000) pp. 9-12.

Zhang, J. Wenjun, et al., "Regional and differential expression of gelatinases in rat brain after systemic kainic acid or bicuculline administration", European Journal of Neuroscience, vol. 10, pp. 3358-3368, 1998.

Zheng, Xiang-Yu, et al., "Kainic Acid-Induced Neurodegenerative Model: Potentials and Limitations", Journal of Biomedicine and Biotechnology, vol. 2011, Article ID 457079, 10 pages, doi:10.1155/2011/457079.

Ben-Ari, Y. (1985) "Limbic seizure and brain damage produced by kainic acid: Mechanisms and relevance to human temporal lobe epilepsy", Neuroscience, vol. 14(2), pp. 375-403.

Vezzani, A., et al. (2013). "The role of inflammation in epileptogenesis" Neuropharmacology, vol. 69, pp. 16-24.

Mckhann, G.M. et al. (2003). "Mouse strain differences in kainic acid sensitivity, seizure behavior, mortality, and hippocampal pathology." Neuroscience vol. 122, pp. 551-561.

Coussens, L. M., et al. (2002). "Matrix metalloproteinase inhibitors and cancer: trials and tribulations." Science, 295 (5564), pp. 2387-2392.

Plane, J. M., et al. (2010). "Prospects for Minocycline Neuroprotection." Arch Neurol. vol 67(12): pp. 1442-1448.

Bronisz, E., et al. (2016). "Matrix Metalloproteinase 9 in Epilepsy: The Role of Neuroinflammation in Seizure Development." Mediators Inflamm. 2016: 7369020.

Wang, N., et al. (2015). "Minocycline inhibits brain inflammation and attenuates spontaneous recurrent seizures following pilocarpine-induced status epilepticus." Neuroscience, vol. 287: pp. 144-156.

Wilczynski, G. M., et al. (2008). "Important role of matrix metalloproteinase 9 in epileptogenesis." Journal of Cellular and Molecular Medicine, vol. 12(5), pp. 1557-1572.

Pitkänen, A., & Lukasiuk, K. (2011). "Mechanisms of epileptogenesis and potential treatment targets." The Lancet Neurology, vol. 10(2), pp. 173-186.

Stellas D, Patsavoudi E (2012) "Inhibiting matrix metalloproteinases, an old story with new potentials for cancer treatment." Anticancer Agents Med Chem 12:707-717.

\* cited by examiner

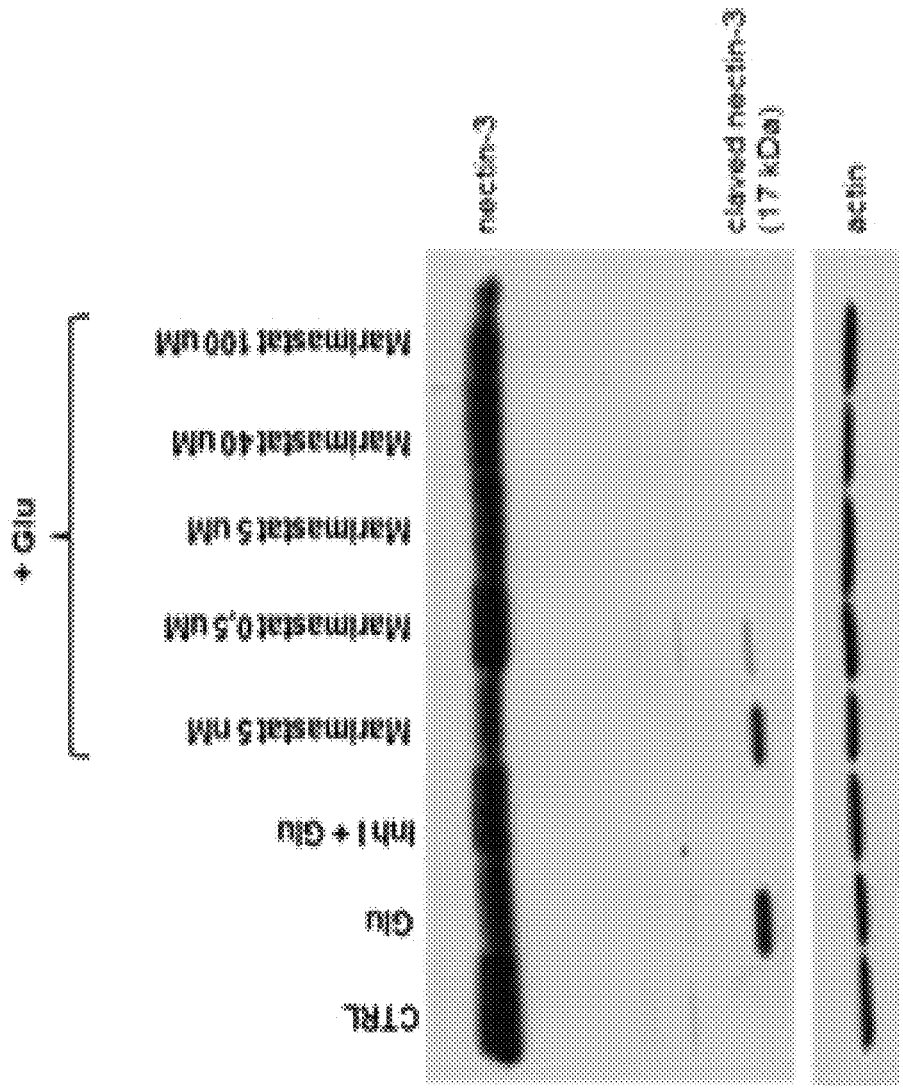
Figure 1. Marimastat inhibits nectin-3 cleavage. Western Blot analysis.

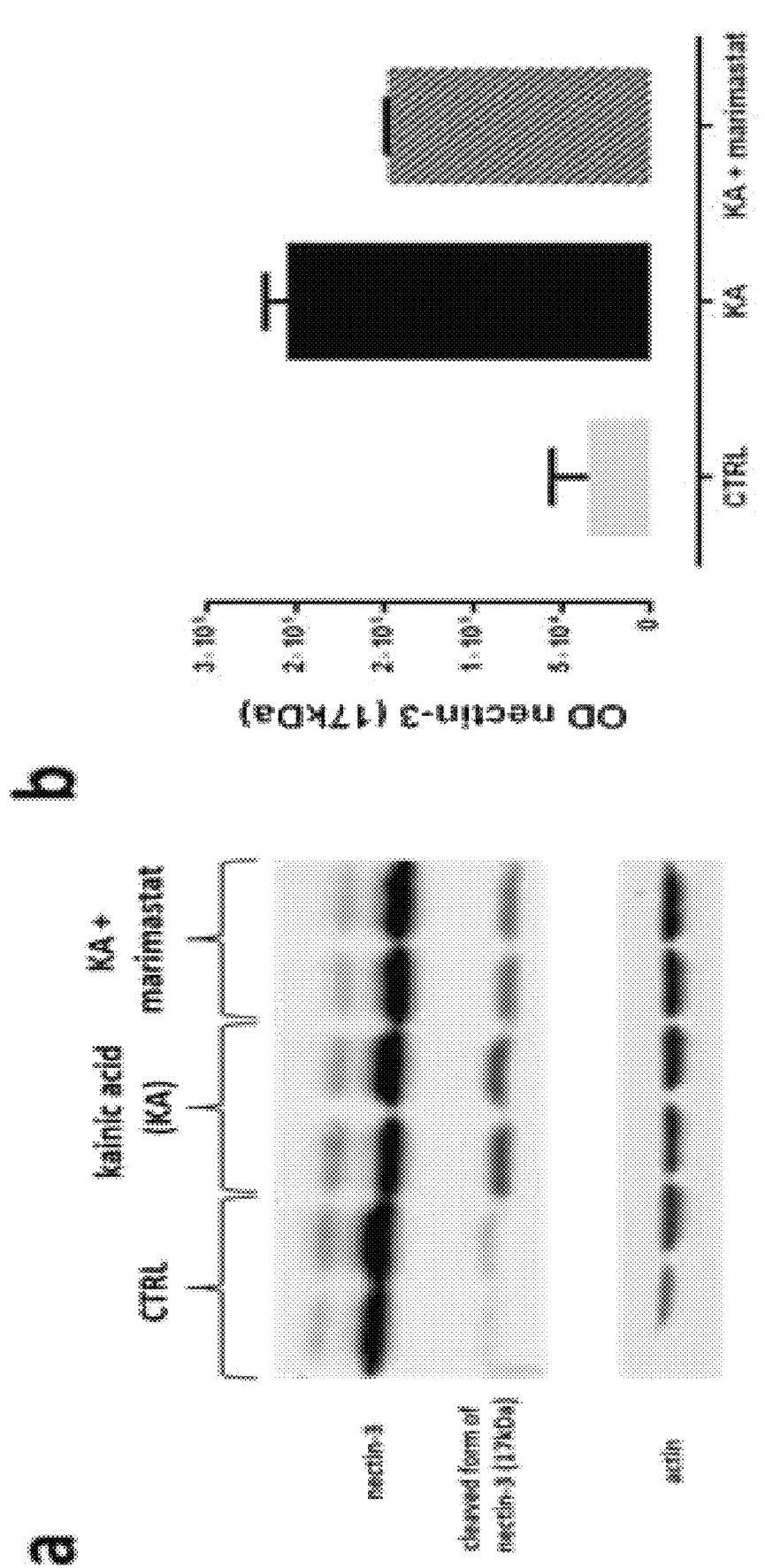
Figure 2. Expression of cleaved form of MMP-9 protein target (17 kDa fragment of nectin-3). a – immunoblotting; b – optical density

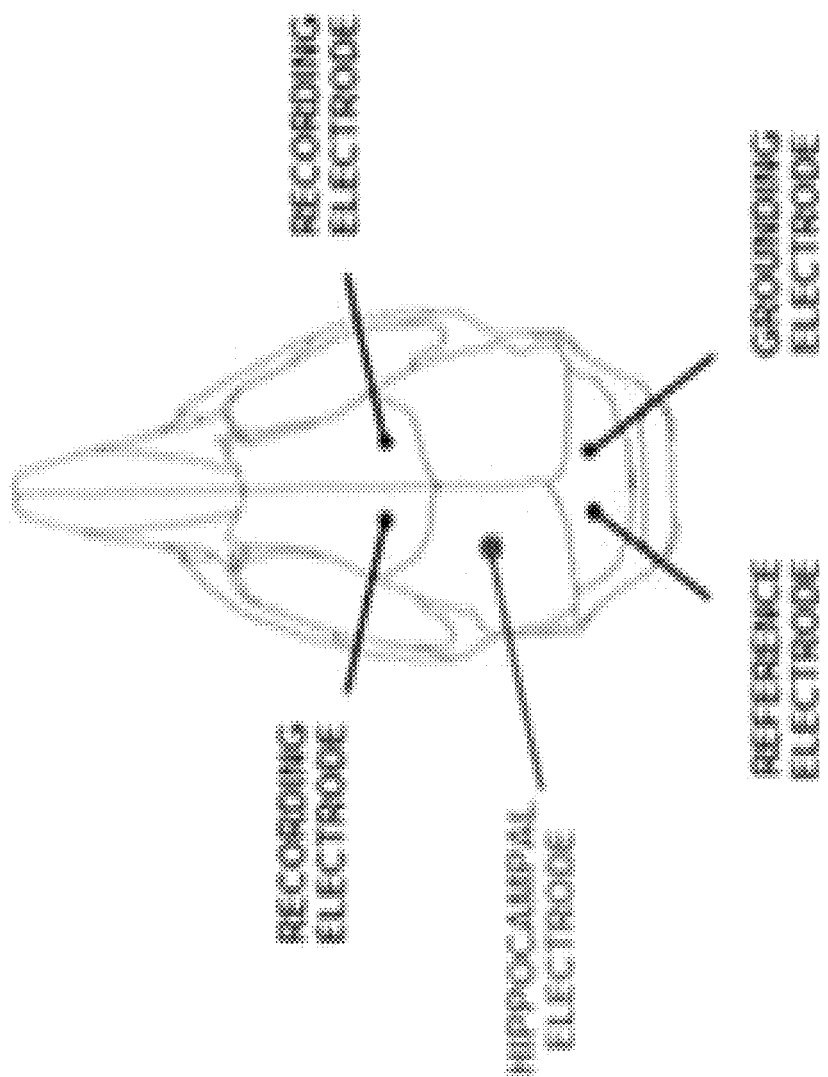
Figure 3. Electrode placement in the skull

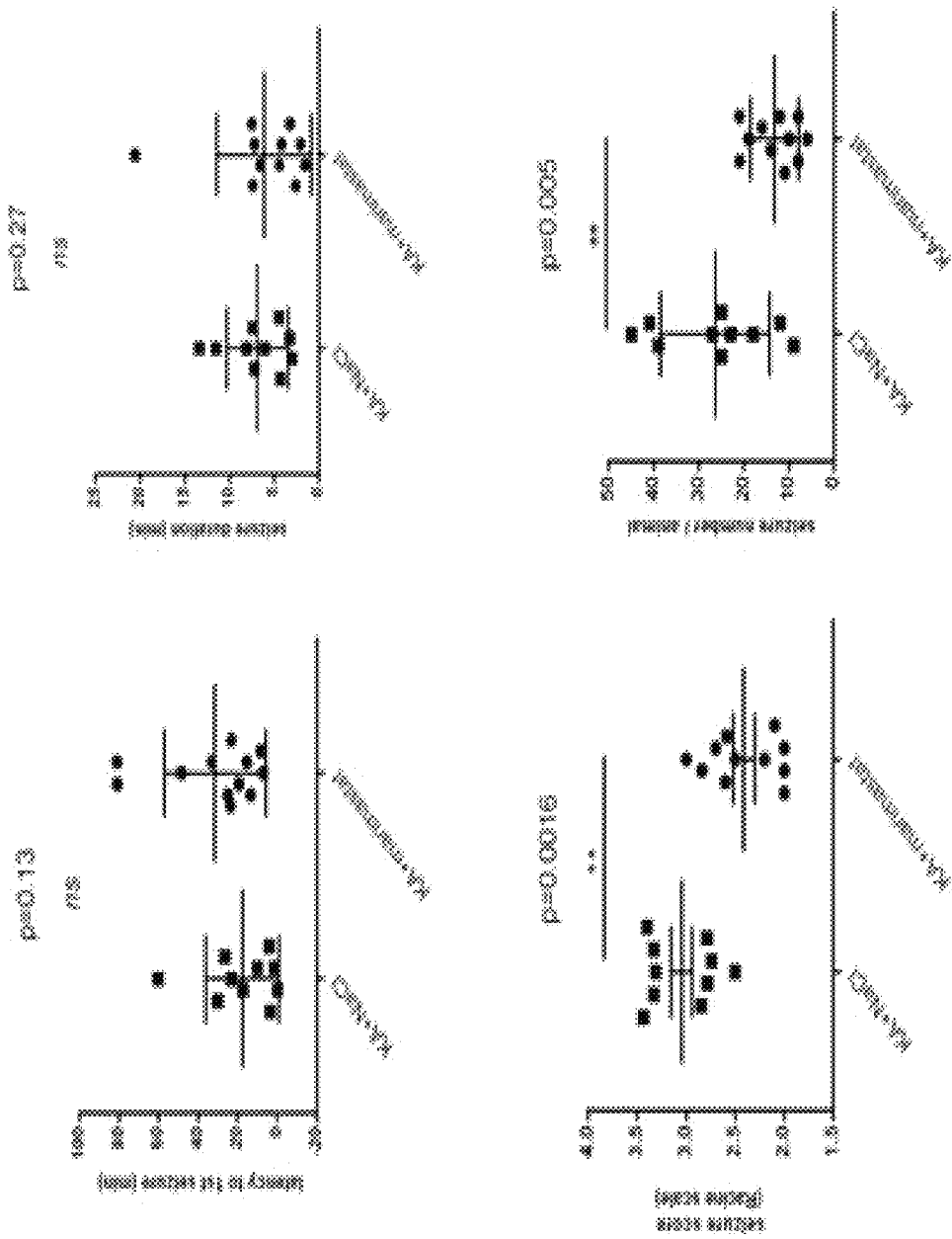
Figure 4. Seizure appearance during first 24 hours after kainic acid injection.

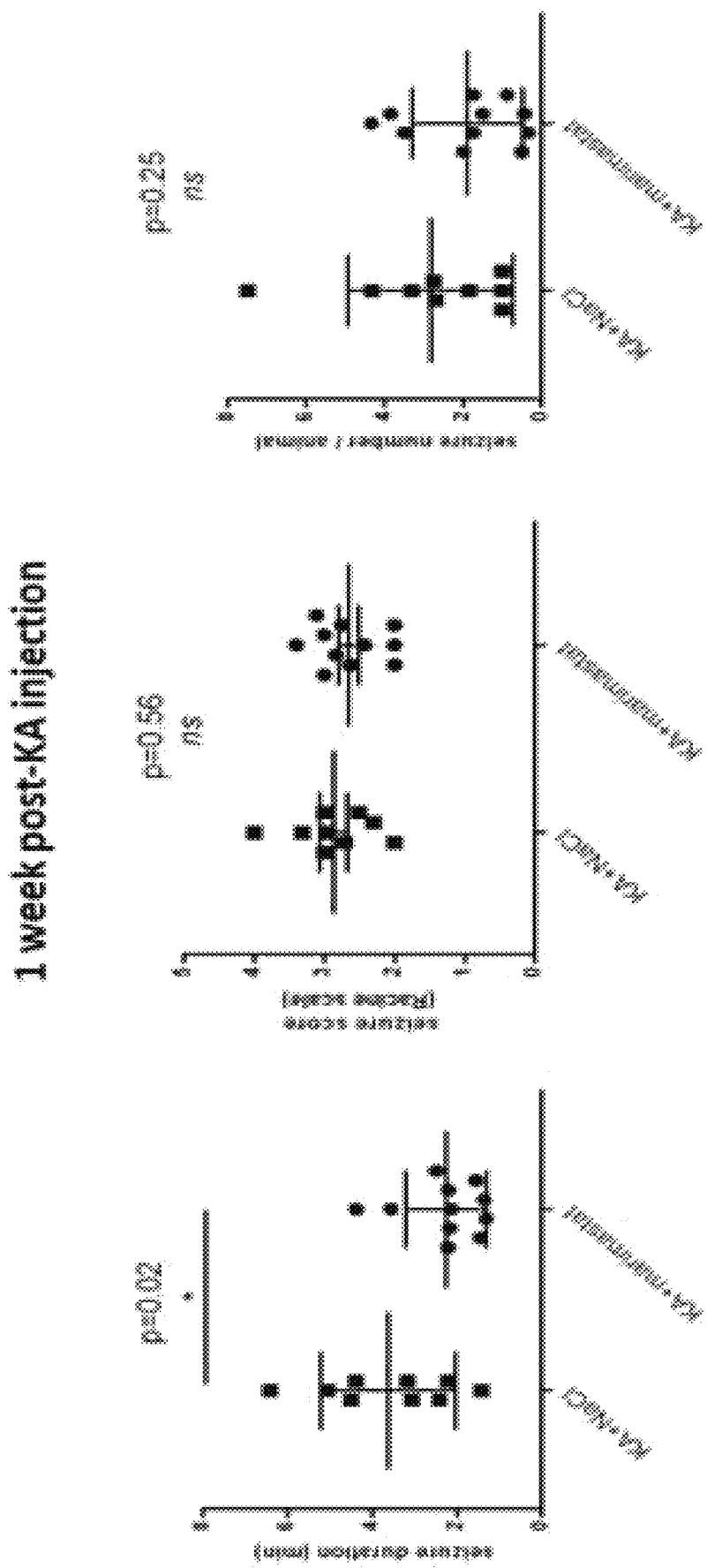
Figure 5. Seizure appearance during first week after kainic acid injection.

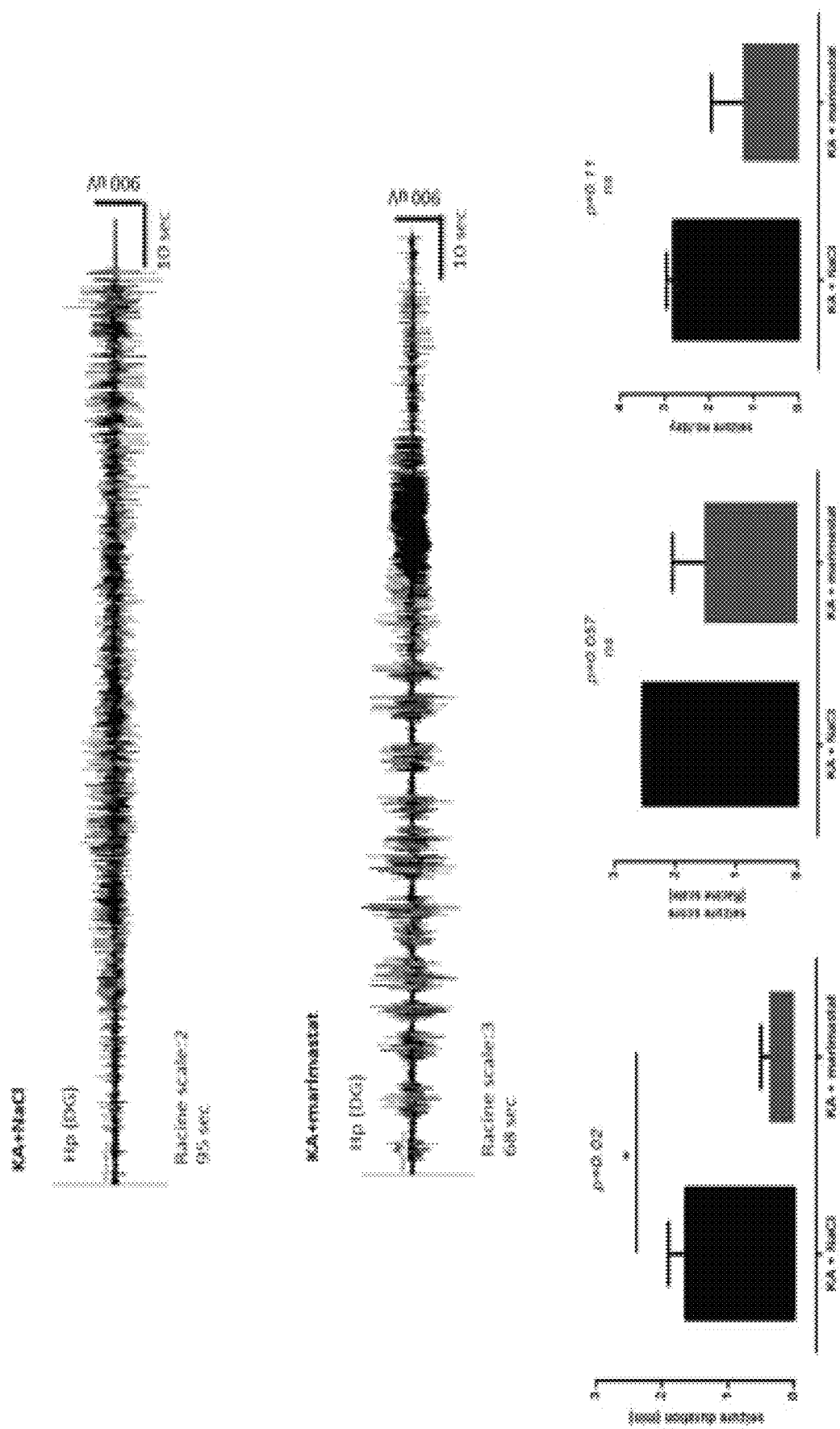
Figure 6. Chronic changes after kainic acid injection.

USE OF MARIMASTAT FOR PREVENTING AND/OR TREATING EPILEPTOGENESIS

CROSS REFERENCE TO RELATED APPLICATIONS

This is a National Phase entry of International Application No. PCT/IB2019/055040, filed Jun. 17, 20219, the disclosures of which are incorporated herein by reference in their entireties.

FIELD OF THE INVENTION

The present invention relates to use of marimastat for preventing and/or treating epileptogenesis.

STATE OF THE ART

Marimastat (BB-2516), a compound according to Formula I,

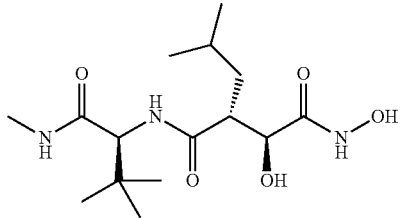

Formula I is a well-known inhibitor of the enzymes belonging to the family known as matrix metalloproteinases (MMPs). These enzymes play an important role in the extracellular matrix proteins degradation in processes of tissue formation and remodeling (Matrisian, 1990). One of the proteases controlling ECM environment under physiological and pathological conditions is MMP-9 that is a type IV collagenase, with gelatinolytic properties. MMP-9 availability and activity is strictly controlled at several levels, including its secretion as a latent proenzyme and inhibition by endogenous tissue inhibitor of metalloproteinases (TIMPs) (Kleiner and Stetler-Stevenson, 1993). Most importantly, excessive MMP-9 activity is thought to play an important role in the pathogenesis of several diseases such as, e.g., cancer or neurodegenerative conditions (Kim and Joh, 2012). Therefore, MMP-9 inhibitors have been considered as therapeutic agents.

Marimastat shows potent broad-spectrum inhibitory activity against most of the major MMPs: MMP-1, MMP-2, MMP-3, MMP-7 and MMP-9 (Rasmussen and McCann, 1997). It was the first matrix metalloproteinase inhibitor introduced into clinical trials in the field of oncology. It has a favorable pharmacokinetic profile in humans, as it is almost completely absorbed after oral administration, with a high and predictable bioavailability and a half-life of approximately 15 hours (justifying twice a day dosing), making it a valid treatment option for clinical trials (Millar et al., 1998). Importantly, short courses of marimastat are well tolerated by patients, while longer treatment (several weeks) with higher doses, is associated with side effects including severe arthralgia (symptomatic inflammatory polyarthritis) which affects up to 60% of patients (King et al., 2003; Renkiewicz et al., 2003; Sparano et al., 2004; Wojtowicz-Praga et al., 1998). These symptoms were reversible by discontinuation of marimastat (Steward and Thomas, 2000). Their incidence has been decreased by using lower doses of marimastat 10 mg/kg b.w. (Bramhall et al., 2002; Steward, 1999).

Marimastat inhibited tumor progression in preclinical trials of murine cancer models: melanoma, hemangioma, ovarian carcinoma, colorectal, breast and pancreatic cancer (Rasmussen and McCann, 1997), where effects on tumor growth were associated with increased survival. Moreover, the positive effect of marimastat has been shown in patients with human pancreatic cancer (Bramhall et al., 2001; Evans et al., 2001; Rosemurgy et al., 1999), lung cancer (Wojtowicz-Praga et al., 1998), breast cancer (Miller et al., 2002), colorectal cancer (North et al., 2000) and gastric adenocarcinoma (Bramhall et al., 2002), but also in the animal model of gastric carcinoma (Kimata et al., 2002).

Surprisingly, the present inventors have experimentally found that marimastat can have a novel and very useful use in the treatment and/or prevention of epileptogenesis. Therefore, the aim of the present invention is to provide the use of marimastat or a pharmaceutically acceptable salt, solvate or polymorph thereof in preventing or treating epileptogenesis in a subject that suffered a brain insult. To date, marimastat has not obtained marketing authorization.

Detrimental side effects prevented long-term use of marimastat in cancer treatment. What is important, trials with healthy subjects did not show any side effects after high single dose (up to 800 mg) or repeated dose (up to 200 mg) for a week, twice a day (Millar et al., 1998). The present inventors have surprisingly found a novel medical use of marimastat for preventing and/or treating epileptogenesis.

DESCRIPTION OF THE DRAWINGS

FIG. 1—Western blot analysis showing that marimastat inhibits nectin-3 cleavage.

FIG. 2—Expression of cleaved form of MMP-9 protein target (17 kDa fragment of nectin-3). a—immunoblotting; b—optical density.

FIG. 3—A top view of mouse's skull showing electrode placement.

FIG. 4—Graphs showing seizure appearance during the first 24 hours after kainic acid injection.

FIG. 5—Graphs showing seizure appearance during the first week after kainic acid injection.

FIG. 6—Graphs showing chronic changes after kainic acid injection.

DETAILED DESCRIPTION OF THE INVENTION

Epileptogenesis

Epileptogenesis is a continuous and prolonged process during which a brain network, that was previously normal, becomes functionally altered toward increased seizure susceptibility, thus having an enhanced probability to generate spontaneous recurrent seizures (Pitkänen et al., 2015). Epileptogenesis is divided into two steps, the first one is the development of an epileptic condition, and the second one is the progression of epilepsy after it is established. In most of the cases, human epileptogenesis is initiated by a brain insult (stroke, traumatic brain injury—TBI, or status epilepticus—SE, evoked by structural or metabolic reasons) (Annegers et al., 1998; Graham Neil S. N. et al., 2013; Hesdorffer et al., 1998). Interestingly, the rate of epileptogenesis differs between the brain insults, being the highest after SE and stroke.

There are several animal models of SE, from which kainic acid injection model was used in the present invention. Kainic acid (KA) is an analog of excitotoxic glutamate, which elicits selective neuronal death in the rodent brain. KA exerts its neuroexcitotoxic and epileptogenic properties by acting on kainate and AMPA ionotropic receptors for glutamate (iGluRs), the major excitatory neurotransmitter. Upon binding to iGluRs, KA induces a number of cellular events, including the influx of cellular Ca2+, production of reactive oxygen species (ROS), and mitochondrial dysfunction, leading to neuronal apoptosis and necrosis (Zheng et al., 2011). Systemic (either intravenous or intraperitoneal), intranasal, or local administration of KA results in a series of clinical manifestations and pathological changes in rodents, including recurrent seizures, behavioral changes of rodents, oxidative stress, including the generation of ROS, and reactive nitrogen species (RNS), hippocampal neuronal death and glial activation (Wang et al., 2005). During the first 20-30 minutes, the animals start showing behavioral changes like: head nodding, standing upright and falling down. Usually it takes around 30 minutes, after which animals start to exhibit recurrent limbic motor seizures developing into status epilepticus (Chuang et al., 2004). On the cell level, KA administration results in hippocampal damage that occurs primarily in the hippocampal hilus CA3 and CA1 areas, but also (with higher doses of KA) in the medial amygdaloid nuclei.

MMP-9 in Epileptogenesis

There are several mechanisms by which MMPs may participate in epileptogenesis and epilepsy, including blood-brain barrier breakdown, contributions to inflammatory reactions and synaptic plasticity. The best examined proteinase with the significant role in different models and types of epilepsy appears to be MMP-9 (Vafadari et al., 2016). First, Zhang et al. (1998; 2000) reported increase in MMP-9 levels (as well as MMP-2) in rodent brain subjected to proconvulsive dose of KA (Zhang et al., 1998, 2000). Next, it was shown that KA upregulates the levels of MMP-9 mRNA but also protein and enzymatic activity (Szklarczyk et al., 2002). Importantly, those responses were limited to the dentate gyrus, i.e., the hippocampal region undergoing the most extensive post-KA plasticity, presumably supporting epileptogenesis. Then, the role of MMP-9 in epileptogenesis was confirmed in two animal models: KA-evoked status epilepticus (SE, a condition known to provoke development of epilepsy) and proconvulsive pentylenetetrazole (PTZ, a GABAa receptor antagonist) chemical kindling (Wilczynski et al., 2008). Wilczynski et al. (2008) showed that the sensitivity to PTZ kindling was decreased in MMP-9 knock-out mice, but increased in transgenic rats with neuronal overexpression of MMP-9. Furthermore, they demonstrated that MMP-9 deficiency diminished KA-evoked pruning of dendritic spines and decreased aberrant synaptogenesis after mossy fiber sprouting. Finally, they also reported that MMP-9 was associated with excitatory synapses, where both the MMP-9 protein levels and enzymatic activity become strongly increased upon seizures. Subsequently, the presumed role of MMP-9 in epileptogenesis was confirmed by Mizoguchi et al., 2011, who showed enhanced MMP-9 activity and expression in the injured hippocampus in PTZ kindling model.

The present invention provides use of marimastat or a pharmaceutically acceptable salt, solvate or polymorph thereof in preventing or treating epileptogenesis in a subject that suffered a brain insult.

In a preferred embodiment, the brain insult is a stroke, traumatic brain injury, or a result of status epilepticus, evoked by structural or metabolic reasons.

Preferably, marimastat or a pharmaceutically acceptable salt thereof is administered orally, sublingually, buccally, subcutaneously, intravenously, intramuscularly or intrathecally.

In still further preferred embodiment, marimastat or a pharmaceutically acceptable salt thereof is administered either in a single dose, or repeated doses, administered twice a day for a maximum of 6.5 days, after induction of epileptogenesis.

Preferably, marimastat or a pharmaceutically acceptable salt thereof is administered in repeated doses in the course of 1-3 days after induction of epileptogenesis.

In yet further preferred embodiment, the single dose of marimastat or a pharmaceutically acceptable salt thereof is of from 200 mg to 800 mg, for human use.

In a preferred embodiment, marimastat or a pharmaceutically acceptable salt thereof is administered within the first 24 hours after induction of epileptogenesis.

In a preferred embodiment, marimastat or a pharmaceutically acceptable salt thereof is administered within 3 hours after induction of epileptogenesis, more preferably marimastat or a pharmaceutically acceptable salt thereof is administered within 1 hour after induction of epileptogenesis, most preferably marimastat or a pharmaceutically acceptable salt thereof is administered within 30 minutes after induction of epileptogenesis.

Here the phrase "induction of epileptogenesis" covers also all causative accidents, including, but not limited to, communication accidents; work injuries; home accidents, such as all types of falls; construction accidents and bar fights, as well as sport-related or military combat-related injuries, leading to a brain insult.

Herein, the term "subject" includes, but is not limited to, a mammal, such as a rodent, including a mouse and a rat; an ungulate, such as a circus or racing horse; or a human, such as a casualty, a stuntman, a sportsman, or a military man.

The present invention is further illustrated by the following non-limiting examples.

EXAMPLES

Example 1—Specific Inhibition of MMP-9 Activity In Vitro

In the first non-limiting example, the compound was tested for specific inhibition of MMP-9 activity in vitro. Hippocampal neurons were prepared from newborn Wistar rats at postnatal day P0 as described previously (Habas et al., 2006). The culture medium consisted of Neurobasal Medium supplemented with B27 (Invitrogen) and 1 mM 1-glutamine, 100 U ml$^{-1}$ penicillin and 0.1 mg ml$^{-1}$ streptomycin. The cells used for these experiments were 7 DIV. Marimastat was used at 5 different concentrations: 5 nM, 0.5 µM, 5 µM, 40 µM and 100 µM, to determine the minimum effective dose. 30 minutes after marimastat administration (in medium supplementation), cells were washed with PBS and treated with glutamate (5 µM; medium supplementation) to stimulate neuronal cell activity leading to release of MMP-9. The control cultures consisted of neurons stimulated with glutamate and of glutamate in the presence of inhibitor I (an inhibitor with proven inhibitory effect on MMP-9 activity). The experiment was repeated four times (on different neuronal cultures as a repetition). The MMP-9 activity level was evaluated by the cleavage of MMP-9 substrate-nectin-3.

Nectin-3 is a transmembrane protein predominantly expressed at post-synaptic part of the synapse (van der Kooij et al., 2014). Nectin-3 degradation can occur through proteolytic shedding of the extracellular N-terminal domain and subsequent cleavage of the intracellular domain. One of the molecular players involved in nectin-3 proteolytic processing is MMP-9. We evaluated the basic amount of nectin-3 (by immunoblotting) and the presence of a cut fragment of nectin-3 (approximately 17 kDa).

For immunoblotting, cultures were homogenized in a lysis buffer containing 1 mM $MgCl_2$, 5 mM HEPES (pH=7.4), 320 mM sucrose, 1 mM $Na_2F$, and cOmplete™ Protease Inhibitor Cocktail (Roche) using Dounce glass homogenizer. Protein concentration was measured using BCA Protein Assay Kit (Pierce). 25 micrograms of homogenates were transferred to 10% polyacrylamide gels. Western blot was performed by a standard procedure using anti-nectin antibody with a dilution 1:500. Next, blots were reprobed with an anti-actin antibody (1:1000) (Sigma) to ensure equal total protein levels. Chemiluminescent detection method was used. For the quantification of individual bands, the scan of the photographic film was analyzed by densitometry using GeneTools software (Syngene).

Results

It was shown that marimastat inhibits MMP-9-dependent cleavage of nectin-3 (already from the 0.5 µM dose applied (FIG. 1)).

Example 2—Blood-Brain Barrier Penetration

Based on previous results showing the inhibitory effect of marimastat in vivo, the present Inventors evaluated whether the compound penetrates the blood-brain barrier, what is a condition for its therapeutic use in animals. For this purpose, mice (C57B16 strain) were injected intraperitoneally with 9 mg of marimastat per kg body weight.

One hour after intraperitoneal administration of marimastat, mice (C57B16 strain) were sacrificed and blood samples, brain tissue (hippocampus and cortex area) were collected. Blood samples were subjected to centrifugation in the presence of citrate, to obtain serum. The extraction method of marimastat present in the samples was selected and developed according to the properties of the compound. In this case, the present Inventors used extraction with mixture of acetonitrile and water (1:1 v/v) and purified the obtained product with n-hexane to remove lipophilic compounds of the matrix, such as fatty acids, lipids, cholesterol, etc., whose presence in the sample causes a large suppression of the recorded analytical signal in the detection technique.

Reproducibility of marimastat extraction was close to 100% (relative standard deviation RSD including the repeatability of the extraction performance as well as the technical measurement for n=3 is below 2%). Measurement of the compound concentration in hippocampus and cortex extracts and in blood serum samples was carried out using the HPLC-ESI MS/MS technique in MRM mode: high performance liquid chromatography with electrospray mass spectrometry detection in MRM mode (follow-up monitoring). The measurement method has been optimized in order to achieve maximum sensitivity with the use of standard solutions. Analytical methods developed for marimastat were partially validated (repeatability, reproducibility, recovery).

Results

Marimastat was detected in both brain parts (hippocampus and cortex) as well as in blood serum, which means that marimastat penetrates through the blood-brain barrier and can be used for animal testing, exerting an inhibitory effect on MMP-9 in the brain.

TABLE 1

Penetration of the blood-brain barrier

| MARIMASTAT/ (60 min) | hippocampus (ng/g) | cortex (ng/g) | plasma (ng/ml) |
|---|---|---|---|
| Sample 1 | 36.9 | 25.3 | 1.2 |
| Sample 2 | 60.2 | 26.2 | 1.4 |
| Sample 3 | 78.6 | 38.3 | 4.6 |

Example 3—Marimastat in Mouse Model of Epileptogenesis

In a further nonlimiting example, marimastat was tested in vivo, in a mouse model of epileptogenesis (intra-hippocampal kainic acid injection). Based on the previous results it was known that marimastat penetrates the blood-brain barrier and remains present in the brain within more than one hour after administration. This is the optimal time allowing for its potential therapeutic effects. At this stage the present Inventors evaluated the effect of marimastat on MMP-9 inhibition, after single injection of subconvulsant (kainic acid, an agonist of glutamate receptors). Mice were injected with marimastat (9 mg/kg b.w.) intraperitoneally, 1 hour prior to KA administration. One hour after marimastat injection, 40 mM of kainic acid were administered intraperitoneally. As a result of the KA injection, strong epileptic seizures were observed due to increased neuronal activity.

The process of developing epileptic seizures evoked by KA (epileptogenesis) is strongly associated with the release of MMP-9 from dendritic spines. Use of marimastat administration before the convulsant injection verified its effectiveness in vivo. For this purpose, after 6 hours following KA-injection the hippocampus was isolated and the immunoblotting assay was performed for the presence of cleaved form of nectin-3 protein.

Results

It was found that administration of the inhibitor specifically reduced the MMP-9-dependent process of nectin-3 enzymatic cleavage (optical density of the 17 kDa nectin-3 fragment, FIG. 2a-b).

Summarizing, marimastat as a potential compound for anti-epileptogenic activity met the following conditions:

TABLE 2

Advantages of using marimastat

| | |
|---|---|
| 1. | Inhibits the MMP-9-dependent protein cleavage in vitro, as investigated using hippocampal dissociated cell cultures |
| 2. | After the intraperitoneal administration, penetrates through the blood-brain barrier (BBB) |
| 3. | Inhibits the MMP-9-dependent protein cleavage in vivo, as investigated using the animal model of SE (status epilepticus) |

Example 4—Functional Analysis of Therapeutic Use of Marimastat in Mouse Model of Epileptogenesis The functional analysis of therapeutic use of marimastat in mouse model of epileptogenesis (intra-hippocampal kainic acid injection) was performed. Epileptogenesis was induced by the administration of kainic acid directly into the CA1 region of the hippocampus, during stereotactic surgeries. Coordinates for CA1 were chosen according to Paxinos Mouse Brain Atlas. Coordinates in 3 surfaces were used:

| 1. | Z axis—AP (anterior-posterior) | −1.8 |
| 2. | X axis—L (lateral) | +1.7 |
| 3. | Y axis—DV (dorsal-ventral) | −2.1 |

Marimastat was used as an inhibitor for the MMP-9 activity. The mice were injected intraperitoneally (9 mg/kg b.w.), 3 times after administration of kainic acid at:
1. 30 minutes
2. 6 hours
3. 24 hours As a control group, the present Inventors used mice after administration of kainic acid into the CA1 region, without subsequent marimastat injections. Each group consisted of 6 animals; the experiment was performed in two repetitions. Simultaneously, just after KA injections, mice were implanted with cranial and hippocampal electrodes for EEG registration (FIG. 3).

5 electrodes were used, 4 of which were placed in the skull and one in the hippocampus to register the hippocampal seizures. Injected kainic acid stimulated the degeneration within CA1 and CA3 region, but also led to the changes within dentate gyms area. One of the most important changes observed in the epileptogenesis process was mossy fiber sprouting located in dentate gyms DG. Mossy fiber sprouting is defined as an aberrant sprouting of granule cells axons (mossy fibers) into the inner molecular layer of the dentate gyrus. This process is observed in patients with temporal lobe epilepsy (Buckmaster, 2012). Therefore, hippocampal electrode location was implanted into DG, below the injection site, according to coordinates:

| 1. | Z axis—AP (anterior-posterior) | −2.0 |
| 2. | X axis—L (lateral) | +1.3 |
| 3. | Y axis—DV (dorsal-ventral) | −1.7 |

TABLE 3

Position of the electrodes in the skull

| 1. | Left prefrontal cortex | Cortical electrode |
| 2. | Right prefrontal cortex | Cortical electrode |
| 3. | Above the cerebellum | Reference electrode |
| 4. | Above the cerebellum | Grounding electrode |
| 5. | DG region of the hippocampus (placed in accordance with the coordinates) | Hippocampal electrode (bipolar) |

The Electrode Implantation Process

The electrode implantation process proceeded according to the following protocol. Stainless steel screw electrodes (Ø1.6 mm, Bilaney Consultants GmbH, Germany) were placed in the skull (Table 3; FIG. 3). A bipolar hippocampal electrode was positioned in the dentate gyms. The 2-week continuous (24 h/7 days) video-EEG (vEEG) monitoring was started immediately after KA injection. Mice were placed in PMMA cages (one mouse per cage) and connected to the recording system with commutators (SL6C, Plastics One Inc., USA). vEEG was performed using the Twin EEG recording system connected to a Comet EEG PLUS with 57-channel amplifier AS40-PLUS (Natus Medical Incorporated, USA) and filtered (high-pass filter cut-off 0.3 Hz, low-pass filter cut off 100 Hz). The behavior of the animals was recorded using a digital camera I-PRO WV-SC385 (Panasonic, Japan). As outcome measures, the present Inventors assessed the occurrence, frequency and duration of spontaneous seizures. An electroencephalographic seizure was defined as a high amplitude (>2× baseline) rhythmic discharge that clearly represented an abnormal EEG pattern that lasted >5 s. The frequency of seizures in each mouse was calculated as the number of seizures per completed EEG recording day or per week.

Modified Racine's scale was used in the study (Racine, 1972):

| score 0 | electrographic seizure without any detectable motor manifestation |
| score 1 | mouth and face clonus, head nodding |
| score 2 | clonic jerks of one forelimb |
| score 3 | bilateral forelimb clonus |
| score 4 | forelimb clonus and rearing; score |
| score 5 | forelimb clonus with rearing and falling |

The experiment was divided into three parts:
1) first 24 hours post-KA injection (acute response to injected convulsant)
2) first week post-KA injection (acute response to injected convulsant)
3) 4 weeks after KA injection (epileptogenesis upon injected convulsant—chronic changes)

In each stage, several parameters were calculated: seizure duration (in seconds), seizure score (according the Racine scale), seizure number (per animal/per day). Additionally, in the first 24 hours, the time between the kainic acid injection and first epileptic seizure was also estimated.

On the first day after the injection of KA into the hippocampus, marimastat significantly decreased the seizure score ($P=0.0016$) and seizure number observed during the first 24 hours ($P=0.005$). There were no differences in seizure duration as well as in the latency compared to the 1st seizure parameter (FIG. 4).

In the second part of the experiment, data from the next 7 days of EEG recording for spontaneous seizures appearance using the same parameters were analyzed. In contrast to the first 24 hours, during next week, differences were found only in the seizure duration, where marimastat significantly reduced the duration of the single seizure ($P=0.02$). The seizure score and number did not change upon marimastat treatment.

For full analysis of the therapeutic effect of marimastat on appearance and parameters of seizures induced by convulsant, the present Inventors decided to also evaluate chronic changes as an effect of epileptogenesis process initiated by hippocampal injection of kainic acid. Seizure appearance and seizure parameters (seizure duration & seizure score) were evaluated (FIG. 6).

Results

One month after epileptogenesis process induction, similarly to one-week post-KA injection, marimastat inhibited duration of the single seizure ($P=0.02$) (FIG. 6). The effect is also observed in the examples of the seizures observed within hippocampus, 4 weeks after KA injection. Moreover, marimastat slightly decreased seizure score and number, but the changes were not significant.

REFERENCES

Annegers, J. F., Hauser, W. A., Coan, S. P., and Rocca, W. A. (1998). A Population-Based Study of Seizures after Traumatic Brain Injuries. N. Engl. J. Med. 338, 20-24.

Bramhall, S. R., Rosemurgy, A., Brown, P. D., Bowry, C., Buckels, J. A., and Marimastat Pancreatic Cancer Study Group (2001). Marimastat as first-line therapy for patients with unresectable pancreatic cancer: a randomized trial. J. Clin. Oncol. Off. J. Am. Soc. Clin. Oncol. 19, 3447-3455.

Bramhall, S. R., Hallissey, M. T., Whiting, J., Scholefield, J., Tierney, G., Stuart, R. C., Hawkins, R. E., McCulloch, P., Maughan, T., Brown, P. D., et al. (2002). Marimastat as maintenance therapy for patients with advanced gastric cancer: a randomised trial. Br. J. Cancer 86, 1864-1870.

Buckmaster, P. S. (2012). Mossy Fiber Sprouting in the Dentate Gyrus. In Jasper's Basic Mechanisms of the Epilepsies, Chuang, Y.-C., Chang, A. Y. W., Lin, J.-W., Hsu, S.-P., and Chan, S. H. H. (2004). Mitochondrial dysfunction and ultrastructural damage in the hippocampus during kainic acid-induced status epilepticus in the rat. Epilepsia 45, 1202-1209.

Evans, J. D., Stark, A., Johnson, C. D., Daniel, F., Carmichael, J., Buckels, J., Imrie, C. W., Brown, P., and Neoptolemos, J. P. (2001). A phase II trial of marimastat in advanced pancreatic cancer. Br. J. Cancer 85, 1865-1870.

Graham Neil S. N., Crichton Siobhan, Koutroumanidis Michael, Wolfe Charles D. A., and Rudd Anthony G. (2013). Incidence and Associations of Poststroke Epilepsy. Stroke 44, 605-611.

Habas, A., Kharebava, G., Szatmari, E., and Hetman, M. (2006). NMDA neuroprotection against a phosphatidylinositol-3 kinase inhibitor, LY294002 by NR2B-mediated suppression of glycogen synthase kinase-3beta-induced apoptosis. J. Neurochem. 96, 335-348.

Hesdorffer, D. C., Logroscino, G., Cascino, G., Annegers, J. F., and Hauser, W. A. (1998). Risk of unprovoked seizure after acute symptomatic seizure: effect of status epilepticus. Ann. Neurol. 44, 908-912.

Kim, Y.-S., and Joh, T. H. (2012). Matrix Metalloproteinases, New Insights into the Understanding of Neurodegenerative Disorders. Biomol. Ther. 20, 133-143.

Kimata, M., Otani, Y., Kubota, T., Igarashi, N., Yokoyama, T., Wada, N., Yoshimizu, N., Fujii, M., Kameyama, K., Okada, Y., et al. (2002). Matrix metalloproteinase inhibitor, marimastat, decreases peritoneal spread of gastric carcinoma in nude mice. Jpn. J. Cancer Res. Gann 93, 834-841.

King, J., Zhao, J., Clingan, P., and Morris, D. (2003). Randomised double blind placebo control study of adjuvant treatment with the metalloproteinase inhibitor, Marimastat in patients with inoperable colorectal hepatic metastases: significant survival advantage in patients with musculoskeletal side-effects. Anticancer Res. 23, 639-645.

Kleiner, D. E., and Stetler-Stevenson, W. G. (1993). Structural biochemistry and activation of matrix metalloproteases. Curr. Opin. Cell Biol. 5, 891-897.

Matrisian, L. M. (1990). Metalloproteinases and their inhibitors in matrix remodeling. Trends Genet. TIG 6, 121-125.

Millar, A. W., Brown, P. D., Moore, J., Galloway, W. A., Cornish, A. G., Lenehan, T. J., and Lynch, K. P. (1998). Results of single and repeat dose studies of the oral matrix metalloproteinase inhibitor marimastat in healthy male volunteers. Br. J. Clin. Pharmacol. 45, 21-26.

Miller, K. D., Gradishar, W., Schuchter, L., Sparano, J. A., Cobleigh, M., Robert, N., Rasmussen, H., and Sledge, G. W. (2002). A randomized phase II pilot trial of adjuvant marimastat in patients with early-stage breast cancer. Ann. Oncol. Off. J. Eur. Soc. Med. Oncol. 13, 1220-1224.

Mizoguchi, H., Nakade, J., Tachibana, M., Ibi, D., Someya, E., Koike, H., Kamei, H., Nabeshima, T., Itohara, S., Takuma, K., et al. (2011). Matrix metalloproteinase-9 contributes to kindled seizure development in pentylenetetrazole-treated mice by converting pro-BDNF to mature BDNF in the hippocampus. J. Neurosci. Off. J. Soc. Neurosci. 31, 12963-12971.

North, H., King, J., and Morris, D. L. (2000). Effect of marimastat on serum tumour markers in patients with colorectal cancer. Int. J. Surg. Investig. 2, 213-217.

Pitkänen, A., Lukasiuk, K., Dudek, F. E., and Staley, K. J. (2015). Epileptogenesis. Cold Spring Harb. Perspect. Med. 5.

Racine, R. J. (1972). Modification of seizure activity by electrical stimulation: II. Motor seizure. Electroencephalogr. Clin. Neurophysiol. 32, 281-294.

Rasmussen, H. S., and McCann, P. P. (1997). Matrix metalloproteinase inhibition as a novel anticancer strategy: a review with special focus on batimastat and marimastat. Pharmacol. Ther. 75, 69-75.

Renkiewicz, R., Qiu, L., Lesch, C., Sun, X., Devalaraja, R., Cody, T., Kaldjian, E., Welgus, H., and Baragi, V. (2003). Broad-spectrum matrix metalloproteinase inhibitor marimastat-induced musculoskeletal side effects in rats. Arthritis Rheum. 48, 1742-1749.

Rosemurgy, A., Harris, J., Langleben, A., Casper, E., Goode, S., and Rasmussen, H. (1999). Marimastat in patients with advanced pancreatic cancer: a dose-finding study. Am. J. Clin. Oncol. 22, 247-252.

Sparano, J. A., Bernardo, P., Stephenson, P., Gradishar, W. J., Ingle, J. N., Zucker, S., and Davidson, N. E. (2004). Randomized phase III trial of marimastat versus placebo in patients with metastatic breast cancer who have responding or stable disease after first-line chemotherapy: Eastern Cooperative Oncology Group trial E2196. J. Clin. Oncol. Off. J. Am. Soc. Clin. Oncol. 22, 4683-4690.

Steward, W. P. (1999). Marimastat (BB2516): current status of development. Cancer Chemother. Pharmacol. 43 Suppl, S56-60.

Steward, W. P., and Thomas, A. L. (2000). Marimastat: the clinical development of a matrix metalloproteinase inhibitor. Expert Opin. Investig. Drugs 9, 2913-2922.

Szklarczyk, A., Lapinska, J., Rylski, M., McKay, R. D. G., and Kaczmarek, L. (2002). Matrix metalloproteinase-9 undergoes expression and activation during dendritic remodeling in adult hippocampus. J. Neurosci. Off. J. Soc. Neurosci. 22, 920-930.

Vafadari, B., Salamian, A., and Kaczmarek, L. (2016). MMP-9 in translation: from molecule to brain physiology, pathology, and therapy. J. Neurochem. 139 Suppl 2, 91-114.

Wang, Q., Yu, S., Simonyi, A., Sun, G. Y., and Sun, A. Y. (2005). Kainic acid-mediated excitotoxicity as a model for neurodegeneration. Mol. Neurobiol. 31, 3-16.

Wilczynski, G. M., Konopacki, F. A., Wilczek, E., Lasiecka, Z., Gorlewicz, A., Michaluk, P., Wawrzyniak, M., Malinowska, M., Okulski, P., Kolodziej, L. R., et al. (2008). Important role of matrix metalloproteinase 9 in epileptogenesis. J. Cell Biol. 180, 1021-1035.

Wojtowicz-Praga, S., Torri, J., Johnson, M., Steen, V., Marshall, J., Ness, E., Dickson, R., Sale, M., Rasmussen, H. S., Chiodo, T. A., et al. (1998). Phase I trial of Marimastat, a novel matrix metalloproteinase inhibitor, administered orally to patients with advanced lung cancer. J. Clin. Oncol. Off. J. Am. Soc. Clin. Oncol. 16, 2150-2156.

Zhang, J. W., Deb, S., and Gottschall, P. E. (1998). Regional and differential expression of gelatinases in rat brain after systemic kainic acid or bicuculline administration. Eur. J. Neurosci. 10, 3358-3368.

Zhang, J. W., Deb, S., and Gottschall, P. E. (2000). Regional and age-related expression of gelatinases in the brains of young and old rats after treatment with kainic acid. Neurosci. Lett. 295, 9-12.

Zheng, X.-Y., Zhang, H.-L., Luo, Q., and Zhu, J. (2011). Kainic acid-induced neurodegenerative model: potentials and limitations. J. Biomed. Biotechnol. 2011, 457079.

The invention claimed is:

1. A method of preventing or treating epileptogenesis in a subject that suffered a brain insult comprising administering marimastat or a pharmaceutically acceptable salt or solvate thereof, to the subject within the first 24 hours after induction of epileptogenesis.

2. The method according to claim 1, wherein the brain insult is a stroke or traumatic brain injury.

3. The method according to claim 1 or claim 2, wherein marimastat or a pharmaceutically acceptable salt or solvate thereof is administered orally, sublingually, buccally, subcutaneously, intravenously, intramuscularly or intrathecally.

4. The method according to claim 1, wherein marimastat or a pharmaceutically acceptable salt or solvate thereof is administered either in a single dose, or repeated doses, administered twice a day for a maximum of 6.5 days after induction of epileptogenesis.

5. The method according to claim 1, wherein marimastat or a pharmaceutically acceptable salt or solvate thereof is administered in repeated doses in the course of 1-3 days after induction of epileptogenesis.

6. The method according to claim 1 wherein the single dose of marimastat or a pharmaceutically acceptable salt or solvate thereof is of from 200 mg to 800 mg, for human use.

7. The method according to claim 1, wherein marimastat or a pharmaceutically acceptable salt or solvate thereof is administered within 3 hours after induction of epileptogenesis.

8. The method according to claim 1, wherein marimastat or a pharmaceutically acceptable salt or solvate thereof is administered within 1 hour after induction of epileptogenesis.

9. The method according to claim 1, wherein marimastat or a pharmaceutically acceptable salt or solvate thereof is administered within 30 minutes after induction of epileptogenesis.

* * * * *